INVENTOR.
Edward E. McCullough
BY Thomas W. Brennan

INVENTOR.
Edward E. McCullough

INVENTOR.
Edward E. McCullough
BY Thomas W. Brennan

United States Patent Office 3,345,693
Patented Oct. 10, 1967

3,345,693
APPARATUS FOR FORMING IGNITION SURFACES
IN SOLID PROPELLANT MOTORS
Edward E. McCullough, Brigham City, Utah, assignor to
Thiokol Chemical Corporation, Bristol, Pa., a corporation of Delaware
Filed Jan. 27, 1965, Ser. No. 428,466
14 Claims. (Cl. 18—45)

This invention relates to devices for precise forming of internal cavities in hollow articles. More particularly, it relates to mandrels or core pieces useful in casting solid propellant rocket motor charges to obtain smooth and precisely defined ignition surfaces therein.

In current practice, the internal cavity of a solid propellant rocket motor is formed by positioning a core piece or mandrel in the rocket motor case, pouring uncured propellant around the mandrel, permitting the propellant to solidify, i.e., cure, and thereafter extracting the mandrel. The walls of the cavity formed by removal of the core piece become the ignition surface of the rocket motor. In prior art devices, core piece extraction involves the application of relatively tremendous forces, even though release agents have been developed to minimize them. These extraction forces at the present time are necessarily provided by large hydraulic jacks and the like, especially in very high thrust solid propellant motors (say on the order of one million pounds or more) in which the instant invention is primarily intended. Commensurate with these extraction forces and their application in prior art devices are the additional disadvantages of: (1) tearing or pitting of the ignition surfaces of the propellant, (2) undesirable separation of propellant from the case walls, and (3) undue aggravation of already existing bond imperfections between the propellant and the case. These disadvantages create unwanted and potentially dangerous burning surfaces which, in solid propellant rocket motor design, are much to be avoided.

A still further disadvantage of prior art devices, especially of one piece mandrels, is the necessity to include a very large aperture in one end (usually the aft or nozzle end) of the rocket motor case to accommodate the mandrel. This is most frequently accomplished by separable motor cases and/or aft end or nozzle closures which are left unassembled until casting and curing of the propellant charge is completed. However, to obtain a pressure tight joint after assembly of sufficient strength to withstand the high pressure developed by the motor when operating, heavy flanged joints are used resulting in unwanted added "dead weight" in the motor. In contrast unitary motor structures require no such "dead" or inert weight which is thus eliminated, hence if the nozzle opening can be used for passage of the mandrel, overall motor efficiency is improved considerably. In unitary structures heretofore, the problem of forming the internal charge cavity through the narrow access of the nozzle throat was not easily resolved, since a mandrel to be useful in such motors must be insertable in the smaller access port (throat) while at the same time be capable of forming the larger diameter cavities and ignition surfaces, a seemingly impossible task. As will hereinafter become apparent, this invention accomplishes this much sought after objective.

In overcoming the above-noted prior art disadvantages, the present invention comprises in its broadest aspects a unique, segmented mandrel or core piece capable of being separably inserted into a unitary or one piece rocket motor case and easily removed therefrom through the relatively narrow throat portion in the nozzle.

Accordingly, it is an object of the invention to provide a device for forming the internal cavity of solid propellant rocket motor which is accommodated by relatively small apertures such as rocket motor nozzle throats.

Another object of the invention is to provide a device for forming the internal cavity of solid propellant rocket motor which is withdrawable therefrom with minimal detrimental effect to the surfaces or walls of said cavity.

A further object of this invention is to provide a device for forming the internal cavity of a solid propellant motor which is withdrawable therefrom without causing propellant separation from the motor case walls.

Still another object of this invention is to provide a device of the character referred to which is assemblable and disassemblable in a rocket motor case with light weight, handling equipment.

A still further object of this invention is to provide a device for precisely forming the ignition surfaces of a solid propellant motor which includes a centrally positioned post supporting a plurality of laminar components of unique construction assembled within the motor case to form a casting mandrel about which uncured solid propellant is cast to form in a precise manner, a cavity, the walls of which are the ignition and burning surfaces of said solid propellant.

A still additional object is to provide a device of the class described which comprises a central, longitudinally extending post fixed at one end and having installed thereon individual, laterally extending, flexible and/or resilient elements conforming to a predetermined cross-sectional area of the cavity desired, and which is insertable through a small area such as that provided by the rocket motor nozzle throat.

These and other objects and advantages of the invention, as will become apparent from what follows, are achieved as indicated from the following description when examined with reference to the drawings, wherein corresponding parts are designated by identical characters throughout the views, and in which.

Figure 1:
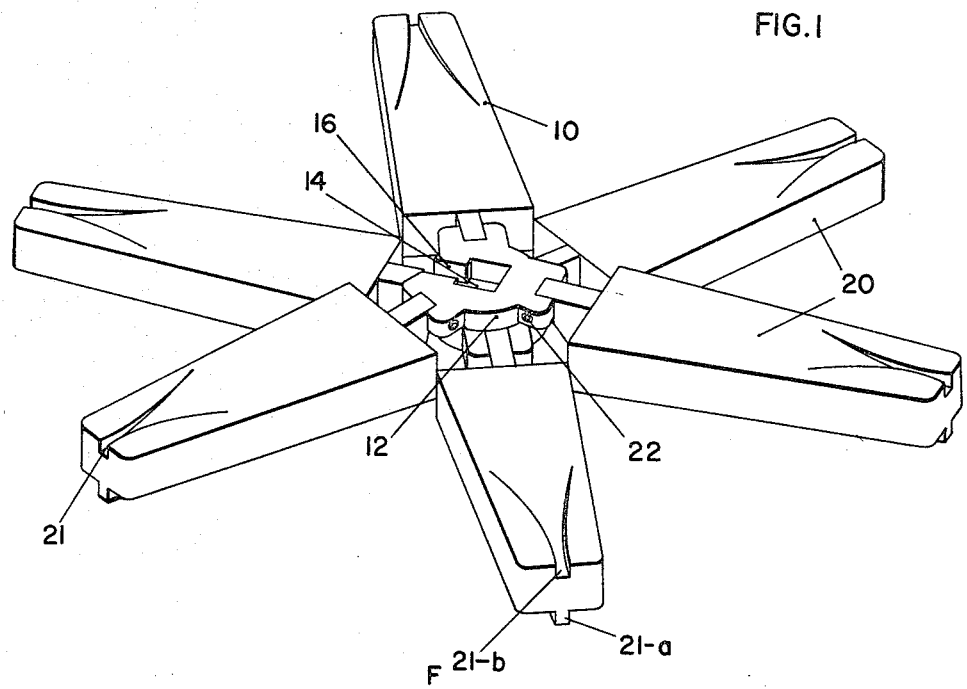
FIGURE 1 is a perspective view of a pair of components of a preferred form of the invention illustrating their several parts and relative position when arranged in a rocket motor.
Figure 2:
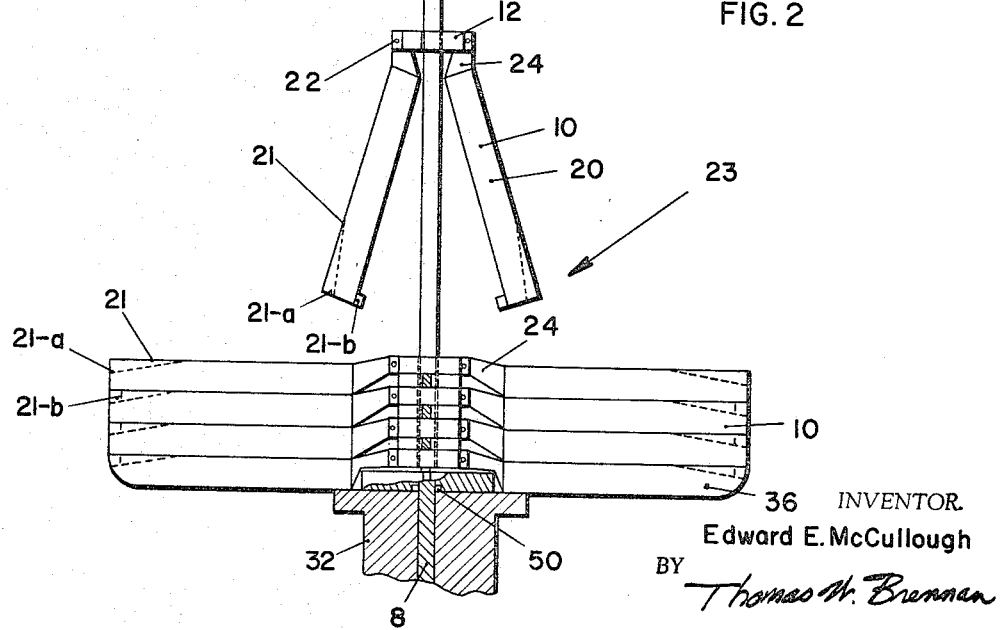
FIGURE 2 is a side elevation in section of some of the components of FIGURE 1 arranged in the bottom or head end portion of the interior of a rocket motor.
Figure 3:
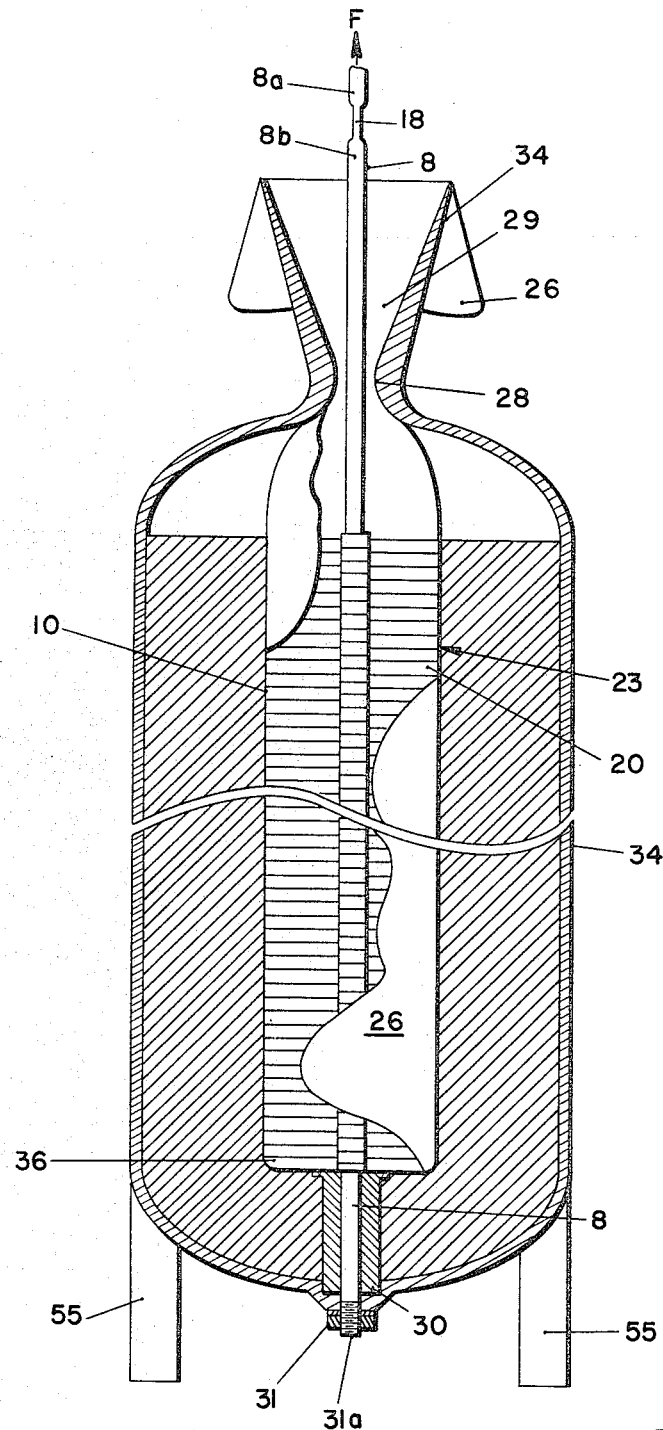
FIGURE 3 is a side elevation in section, of a unitary rocket motor construction showing the invention arranged therein.

In its preferred form, the invention is illustrated in FIGS. 1, 2 and 3 and comprises a mandrel 23 consisting of a longitudinal spindle, channel or post 8 of generally rectangular cross-section, centrally positioned in a rocket motor casing 34 (FIG. 3) having a plurality of laminar components 10 positioned thereon. Each component 10 comprises a collar 12 having a central hole 14. Hole 14 is shaped to permit sliding of component 10 on post 8 while preventing rotation. Component 10 further comprises a number of radially extending leaves 20 (FIG. 1), which are hingeably connected to collar 12 by means of hinge pins 22 (see also FIG. 1). Also contemplated herein is a flexible connection between central collar 12 and leaves 20 and such can be fashioned by means of a flexible strap or a flexible plastic connector of polyethylene, polypropylene, fluorocarbon material and the like which is fabricated integrally with collar 12. Other modes of insuring a hingelike relationship between leaves 20 and collar 12 will occur to a skilled artisan.

Central hole 14 in collar 12 has a radial slot 16 in one side thereof to facilitate installation of component 10 on post 8 by sliding slot 16 over narrowed portion 18 thereof (FIG. 2). As shown in FIG. 3, channeled post 8 is extensible in the central portion of motor casing 34 and is fixed at the lower extremity thereof in an igniter port 30 by means of internally threaded nut and washer 31 on threaded end 31–a of post 8, and at its upper extremity by means (not shown) under tension as indicated by force symbol F. In passing to the lower exterior of casing 34, post 8 passes through a bushing stop 32, the function of which will be hereinafter explained in conjunction with special or bottom component 36.

Slot 16 is purposely formed of smaller width than hole 14 in collar 12 to insure against accidental separation of components 10 from channel 8. Components 10 are comprised, as stated above, of leaves or star points 20 spaced 120° apart and mounted on collar 12 by hinge pins 22. Leaves or star points 20 are formed or otherwise equipped with alignment projections 21–a on the lower or underside thereof. Alignment projections 21–a engage with notches 21–b through notching guides 21 on the upper side of leaves 20.

An alternate arrangement of post 8 is indicated in FIG. 2 wherein upper end 8–a is separable from the remaining or lower section 8–b thereof. As shown, ends 8–a and 8–b are fabricated with mating thread portions and can thus be separated for installation of components 20 on post or spindle 8. In other embodiments, spindle 8 can be circular in cross section and comprise a lengthwise slot or keyway which received a tab or projection (not shown in central collar 14). Many other forms and embodiments will also become apparent to one skilled in the art from what follows.

Components 10 are, in general, identical in configuration; however, as set forth in FIGS. 2 and 3, depending upon the rocket motor case in which the invention is to be used, the bottom ones may have a somewhat different shape to conform with the desired propellant head end surface configuration. For instance, in FIG. 3 in the lower or head end of rocket motor case 34, laminar component 36 is shaped so as to conform to the contour of the particular head end internal propellant surface indicated, as an example. Any shape can, of course, be used. In all other respects, component 36 is identical with components 10.

The material of leaves 20 can be any conceivable material i.e., plastic, metal, composite, etc., as set forth hereinbefore, since, as indicated in FIG. 3, the assembled mandrel 23 is encased in a thin flexible sheet 26 of plastic material such as polyethylene. Polyethylene or the like cover 26 is frequently used, especially in conjunction with certain high energy propellant systems wherein the danger of premature ignition of propellant is present due to propellant becoming lodged between leaves 20 of components 10. Usually, however, ordinary care taken during assembly of mandrel 23 will avoid such hazards.

FIGURE 1 is illustrative of a pair of components 10, showing their relative position when installed on spindle or post 8. Also indicated is the angular relationship of leaves 20 on components 10, wherein each three-leaf component is disposed about post 8 such that its collar 12 is 180° "out of phase" with that of its adjacent component 10. In this manner, "stacking" of components 10 as illustrated in FIGS. 2 and 3 results in the usual six-pointed star configuration much desired and used in present day rocket motor grains of the solid propellant type. Other cross-sectional configurations can, of course, be similarly prepared and arranged.

FIGURE 2 illustrates the manner in which mandrel 23 is assembled beginning with the bottommost component 36 in casing 34, which for clarity is omitted. As shown, three succeeding components 10 have been assembled on bottom component 36 and a fourth is being lowered into position and is shown just prior to extension of its leaves 20. FIG. 2 thus illustrates separability of post 8 end into two parts or portions 8–a and 8–b, stacking of components 10 including the mating of notches 21–b and projections 21–a in notching guides 21, and the hinging relationship of leaves 20 to collar 12 about hinge pins 22. Obviously, leaves 20 can be attached to collar 12 by any flexible means, i.e., a leather or plastic strap or by fashioning a one piece collar and connector of flexible plastic material to which leaves 20 may be easily attached. Alternatively, the entire component can be made flexible by simply fashioning it of a plastic material such as above named and set forth. Finally in FIG. 2, the position of bushing stop 32 is illustrated and indicates its purpose in limiting downward movement of mandrel 23.

Figure 5:
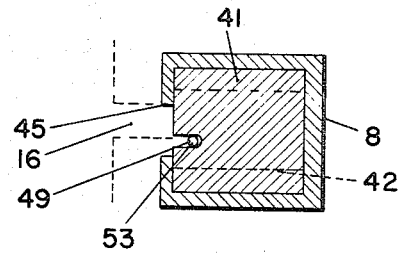
FIGURE 5 is a section taken on line 5—5 of FIGURE 4.
Figure 4:
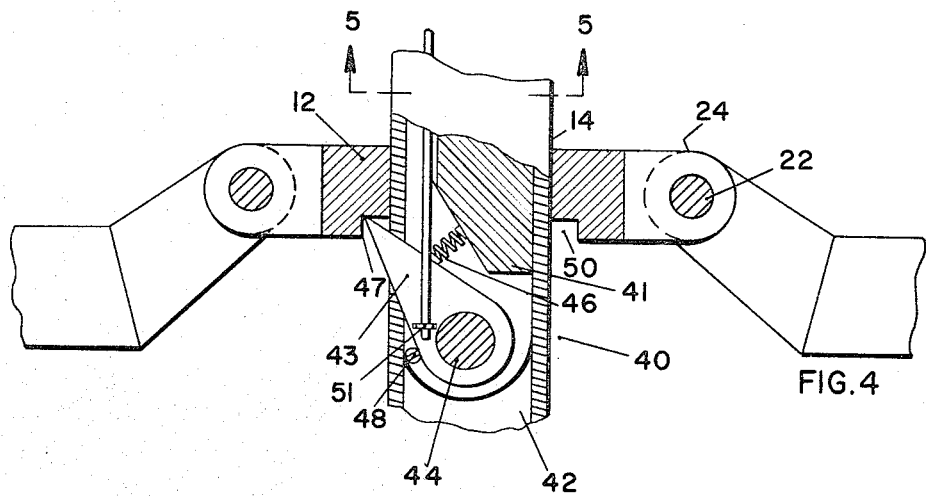
FIGURE 4 is an enlarged, fragmentary sectional view of a portion of FIGURE 2 illustrating a means for handling the components of FIG. 1.
Figure 6:
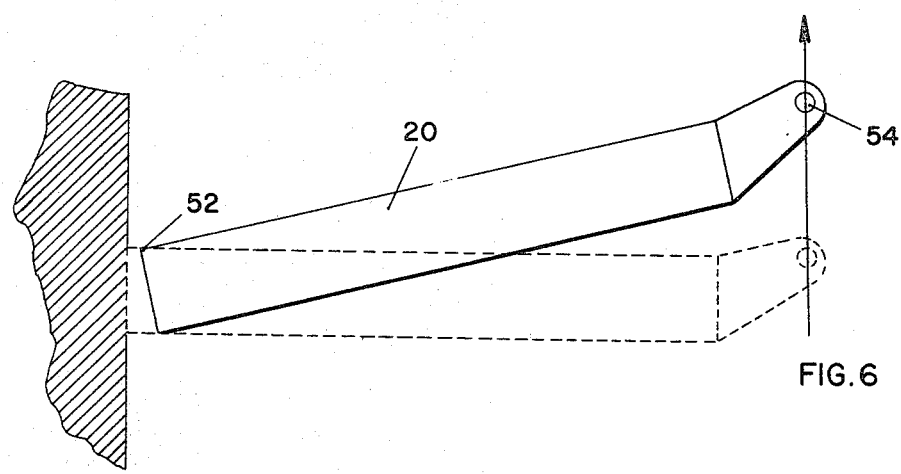
FIGURE 6 is a diagrammatic elevation illustrating a component of the invention in its initial movement during extraction thereof.

FIGURES 4 and 5 are illustrative of a handling device or mechanism for lowering, assembling and extracting components 10 on post or spindle 8 of mandrel 23 in casing 34. Handling device mechanism 40 is comprised of a longitudinally disposed, generally rectangular body 41 of rod-like form having a bifurcated lower end portion 42 slidably disposed within channel or post 8. Rotatably mounted in bifurcated end 42 is a pawl or probe 43 on pivot pin 44. Pawl 43 is urged outwardly into channel opening 45 of channel 8 (FIG. 5) by spring 46. Outward movement of pawl 43 is limited by stop 48 and wall 47 of annular or peripheral recess 50 in collar 12. Pawl 43 is rotatable inwardly against the spring 46 by means of cable 49 which is positioned in groove 53 in body 41. Cable 49 is fastened to pawl 43 by bolts or other fastening means well known to those skilled in the art. Body 41, pawl 43 and spring 46 which comprise mechanism 40, cooperate to effect removal of components 10 in a unique manner, as will be hereinafter set forth with reference to FIG. 6.

In operation of the invention, reference should be made to FIG. 3, wherein is shown a solid propellant rocket motor case 34 of unitary construction. As indicated, and, as is usual in the art, there is at the lower or head end of motor 34, an igniter port 30. Motor case 34 is positioned with the aft or nozzle end upward for convenience in charging case 34 with solid propellant. It is supported in this position by any of various well known means for instance metal legs 55. Channel or post 8 is lowered through nozzle 28 until its lower threaded end 31–a extends through igniter port 30 where it is fastened and centrally positioned by nut and washer 31. As indicated by F, channel 8 opposite end 8–a is also fastened by means (not shown) to hold post 8 under tension and to centrally position it with respect to casing 34. Prior to tensioning post 8, handling mechanism 40 is interiorly placed therein insuring that pawl 43 extends into channel 8 longitudinal opening 45 (FIG. 4). Alternatively, post 8 can be inserted in motor 34 with mechanism 40 already installed. With mechanism 40 installed, contoured laminar component 36 is positioned on post 8 by sliding collar 12 thereon until the outer tip of pawl 43 engages with outer wall 47 in annular recess 50 (see FIG. 4). Laminar component 36 leaves 20, rotate downward on hinge pins 22 (FIG. 2) and thus folded, are rendered capable of passing through throat 28 of nozzle 29. Component 36 is lowered to the bottom of motor case 34 into position as shown in FIGS. 2 and 3.

After placement of component 36, which has its ends formed to a contour determined by design requirements, each component 10 is similarly lowered into position, except that each collar 12 (and hence component 10) is rotated 180° with respect to the component 10 preceding it, by lining up slot 16 with narrowed portion 18 of channel 8 until collar 12 is slidably engaged thereon. Lowering into position is accomplished by cable 49 attached to the pawl 43 of mechanism 40. Pawl 43 is disengaged from component 10 recess 50 by a sharp pull upon cable 49 which causes pawl 43 to rotate inwardly on pivot 44, thereby permitting components 36 (and successive components 10) to assume the positions shown. Handling device or assembly 40 is then raised to the top of channel 8 until it engages with the next component 10 to be lowered where the procedure above is repeated.

As is shown in FIG. 1, as each component 10 is lowered into position, alignment projection 21-a on the underside of each of its leaves 20 are guided into engagement with notches 21-b by arcuate walls of notching guides 21. As the mandrel 23 is built up, the weight of the components 10 is usually sufficient to insure good mating of each projection 21-a with its appropriate notch 21-b and a rigid mandrel results. Similarly, when flexibly connected leaves 20 of components 10 are utilized, leaves 20 will fold thereabout due to their own weight and pass through throat 28 as hereinbefore explained.

When all components 10 are in the desired position, the assembled invention appears as in FIG. 3. Rocket motor case 34 together with assembled mandrel 23 is now ready for the uncured propellant charge. The uncured propellant is poured into the empty space between casing 34 interior wall and the assembled core piece or mandrel 23 until a predetermined level is reached (in the usual case propellant is poured to the level of nozzle 29 entrances as indicated in FIG. 3). The motor and its contents are allowed to cool curing the propellant.

After curing, mandrel 23 is disassembled by lowering mechanism 40 until pawl 43 engages the topmost component 10 at wall 47 in recess 50 (in collar 12) under urging of spring 46. Extraction mechanism 40 is then raised by cable 49 (see FIG. 6) such that the end 54 of leaf 20 is given an initial motion relative to the cured propellant ignition surface 52-a. This motion is a rotation of leaf 20 about point 52 to cause the end thereof to cleanly break away from ignition surface 52-a. Following this, component 10 is withdrawn from casing 34 without sliding or rubbing over ignition surface 52-a which in turn precludes gouging or other damage thereto. Further raising of handling mechanism 40 causes leaves 20 to fold it flexibly connected to collar 12, or rotate about hinge pins 22 permitting easy removal thereof through the narrow passage of throat 28 without danger of damaging, or in any way harmfully affecting, the solid propellant ignition surface 52-a. Since surface 52-a forms the ignition surface of the motor, this advantage of the invention is readily apparent. One by one, each component 10 (and bottom component 36) is removed from the motor and channel 8 is unfastened by removing nut and washer 31 and is similarly withdrawn together with bushing 32 and cover 26 is used. An igniting device (not shown) is installed in igniter port 30, and motor 34 is ready for operation.

Having thus fully described the operation of this invention and its detailed parts, what has been presented herein and deemed to be inventive, is a unique means for fabricating very large solid propellant motors with precisely formed ignition surfaces and charge cavities without fear of damage thereto by the core piece or mandrel as is currently unavoidable. It is to be understood that no undue limitations or restrictions are drawn by reason thereof and that many variations and modifications of the invention can be made by a person of ordinary skill in the art to which this invention pertains. Limitations are to be imposed only as defined by the subtended claims.

What is claimed is:

1. A core piece for forming a cavity in a solid propellant rocket motor charge comprising, a channeled post positioned fore and aft in said rocket motor, a plurality of substantially similar laminar components comprising flexible star points longitudinally positioned on said post, means on said laminar components for raising and lowering thereof, and means for fixing said post to said rocket motor prior to positioning said laminar components thereon.

2. A mandrel for forming the ignition surfaces of a solid propellant rocket charge comprising a central, longitudinally extending post, a plurality of laminar components each comprising a central collar, and at least one radially extending leaf flexibly connected to said collar, said components adapted for assembly on said post for forming a mandrel, said mandrel shaped to correspond to a predetermined longitudinal core in said solid propellant, said leaves shaped to form a predetermined cross-sectional configuration of said core.

3. A mandrel for forming the internal cavity of a solid propellant rocket motor comprising, a channeled post extensible fore and aft through said motor, a plurality of laminar components each comprising a central collar defining an opening adapted for assembly on said post, and comprising a peripheral recess surrounding said opening, at least three radially extending star points flexibly connected to said collar, said star points displaced 120° from each other around said collar, means slidable in said channeled post for engaging said component in said collar recess for assembling and disassembling said components on said post, and aligning means on said star points for aligning each star point with each adjacent star point.

4. The mandrel of claim 1 wherein said star points comprise means for alignment with each adjacent star point when assembled on said post.

5. A core piece for a solid propellant rocket motor comprising, a channeled post extensible fore and aft through said motor, a plurality of laminar components comprising a central collar and at least three radially extending star points hingeably connected to said collar, said collar having a central hole for passage thereof over said post and a recess surrounding said hole, said star points displaced 120° from each other around said collar, means slidable in said post comprising a pivotable pawl, a spring contacting said pawl and urging it outwardly into said channel in said post to engage said recess in said collar, and means attached to said pawl and extensible upwardly through said post for raising and lowering said components on said post and disengaging said pawl from said collar recess.

6. The mandrel of claim 2 wherein said leaves are connected to said collar by means of a hinge.

7. The core piece of claim 1 wherein the laminar components are constructed of a plastic material selected from the group polyethylene, polypropylene and polytetrafluoroethylene.

8. The core piece of claim 1 wherein means are provided on said components to prevent rotation about said post.

9. The core piece of claim 2 wherein said laminar components include alignment means for aligning each of said components with its adjacent component.

10. The mandrel of claim 2 wherein said leaves are connected to said collar by a flexible strap.

11. The mandrel of claim 2 wherein said components are of a one piece construction of a flexible material.

12. The mandrel of claim 2 wherein said components are of a one-piece construction of a flexible material and wherein the component material is selected from the group polyethylene, polytetrafluoroethylene and polypropylene.

13. The mandrel of claim 3 wherein the star points are connected to said collar by a flexible strap.

14. The mandrel of claim 3 wherein the star points are connected to said collar by a hinge.

References Cited

UNITED STATES PATENTS

| | | | |
|---|---|---|---|
| 2,983,958 | 6/1949 | Fay | 18—45 X |
| 3,083,409 | 4/1963 | Crawford et al. | 18—45 |
| 3,120,028 | 2/1964 | Streeter et al. | 249—183 |
| 3,136,831 | 6/1964 | Zinn | 249—61 X |
| 3,193,883 | 7/1965 | Thibodaux et al. | 18—45 X |
| 3,237,913 | 3/1966 | Sellers | 249—185 |
| 3,270,999 | 7/1966 | Fowler et al. | 249—61 |

J. SPENCER OVERHOLSER, *Primary Examiner.*

J. HOWARD FLINT, JR., *Examiner.*